United States Patent
Curtis et al.

(10) Patent No.: US 7,364,475 B2
(45) Date of Patent: Apr. 29, 2008

(54) SPRING BASED CONTINUITY ALIGNMENT APPARATUS AND METHOD

(75) Inventors: Christian Cameron Curtis, Thronton, CO (US); Matthew Thomas Starr, Lafyette, CO (US); Walter Wong, Boulder, CO (US); Ray Dean Heineman, Gig Harbor, WA (US)

(73) Assignee: Spectra Logic Corporation, Denver, CO (US)

( * ) Notice: Subject to any disclaimer, the term of this patent is extended or adjusted under 35 U.S.C. 154(b) by 0 days.

(21) Appl. No.: 11/019,911

(22) Filed: Dec. 22, 2004

(65) Prior Publication Data

US 2006/0134997 A1    Jun. 22, 2006

(51) Int. Cl.
H01R 13/24    (2006.01)
(52) U.S. Cl. ..................................... 439/700
(58) Field of Classification Search .............. 439/700, 439/378, 638, 945, 91, 488–490, 630, 326; 710/129, 103, 301
See application file for complete search history.

(56) References Cited

U.S. PATENT DOCUMENTS

| | | | |
|---|---|---|---|
| 3,858,091 A * | 12/1974 | Wilkinson | 361/724 |
| 4,471,298 A | 9/1984 | Frohlich | |
| 5,270,641 A | 12/1993 | Van Loan et al. | |
| 5,521,586 A | 5/1996 | Takeshita | |
| 5,526,217 A | 6/1996 | Gormley et al. | |
| 5,738,537 A | 4/1998 | Setoguchi et al. | |
| 5,777,845 A * | 7/1998 | Krum et al. | 361/685 |
| 6,176,724 B1 * | 1/2001 | Klatt et al. | 439/326 |
| 6,407,565 B1 | 6/2002 | Sayre et al. | |
| 6,408,352 B1 * | 6/2002 | Hosaka et al. | 710/301 |
| 6,437,556 B1 | 8/2002 | Sparks | |
| 6,600,703 B1 | 7/2003 | Emberty et al. | |
| 6,716,043 B2 * | 4/2004 | Ishizuka | 439/131 |
| 6,788,078 B2 | 9/2004 | Swart | |
| 6,796,813 B1 | 9/2004 | L'Hermet | |
| 6,799,976 B1 | 10/2004 | Mok et al. | |
| 2002/0055292 A1 * | 5/2002 | Maiers et al. | 439/378 |
| 2002/0144044 A1 | 10/2002 | Moon et al. | |
| 2004/0105187 A1 | 6/2004 | Woodruff et al. | |
| 2004/0223253 A1 | 11/2004 | Woodruff et al. | |

(Continued)

FOREIGN PATENT DOCUMENTS

DE    10013864 A1    10/2001
WO    WO 2005/010661 A2    2/2005

OTHER PUBLICATIONS

U.S. Appl. No. 10/950,613, Starr et al.

(Continued)

*Primary Examiner*—Edwin A. Leon

(57) ABSTRACT

Disclosed is a method and apparatus for an alignment system for use in a data storage system for enabling numerous contact cycles between two surfaces in a robust manner. The system includes a first and a second surface each having at least two contact zones. Each of the contact zones comprise either a conductive spring or a conductive pad. Each of the conductive springs is adapted to engage a corresponding conductive pad, wherein the engaging location on the pad is substantially flat, to form at least one closed circuit when the first and the second surfaces are aligned and are in contact. A continuity confirmation device can further be used to confirm the closed circuit.

30 Claims, 15 Drawing Sheets

U.S. PATENT DOCUMENTS

| | | |
|---|---|---|
| 2004/0264037 A1 | 12/2004 | Downey et al. |
| 2004/0264038 A1 | 12/2004 | Heineman et al. |
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2005/0007692 A1 | 1/2005 | Thompson et al. |
| 2005/0047258 A1 | 3/2005 | Starr et al. |
| 2005/0063089 A1 | 3/2005 | Starr et al. |
| 2005/0065637 A1 | 3/2005 | Lantry et al. |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0267627 A1 | 12/2005 | Lantry et al. |

OTHER PUBLICATIONS

U.S. Appl. No. 10/951,321, Wong.
U.S. Appl. No. 10/980,594, Fenske et al.
U.S. Appl. No. 11/011,812, Starr et al.
U.S. Appl. No. 11/037,985, Permut et al.
U.S. Appl. No. 11/040,937, Starr et al.
U.S. Appl. No. 11/089,749, Starr et al.
U.S. Appl. No. 11/123,725, Rector et al.
U.S. Appl. No. 11/126,025, Rector et al.
U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Lantry et al.
PCT Application No. US05/45168, Spectra Logic Corporation.
PCT Application No. US05/46447, Spectra Logic Corporation.

* cited by examiner

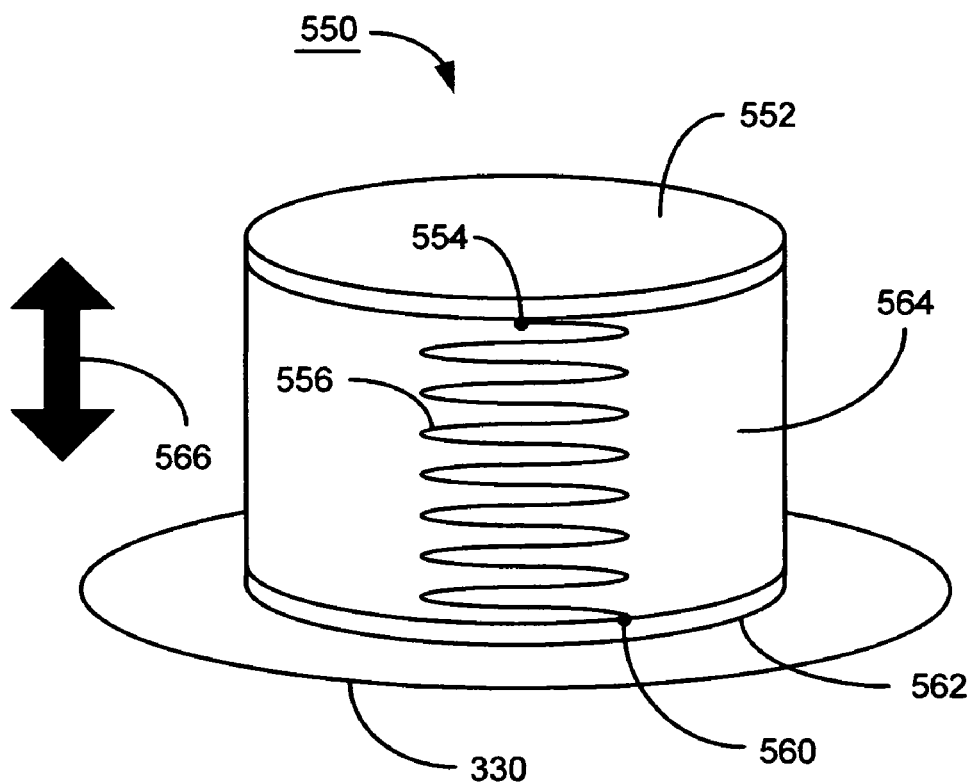
FIG. 5C
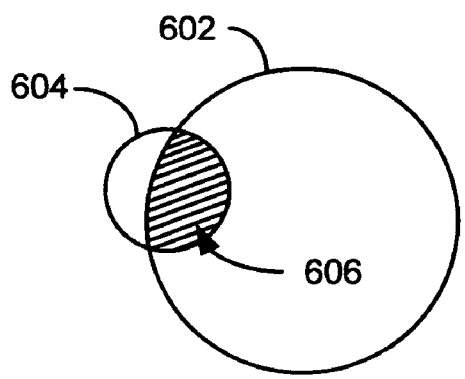
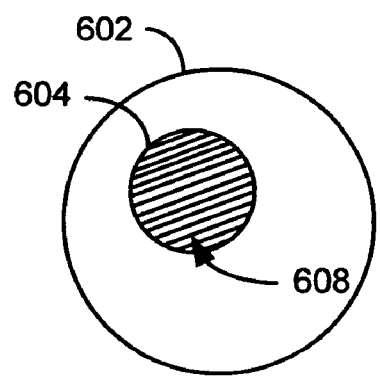
FIG. 6A            FIG. 6B

SPRING BASED CONTINUITY ALIGNMENT APPARATUS AND METHOD

CROSS-REFERENCE TO RELATED APPLICATIONS

None.

FIELD OF THE INVENTION

The present invention relates generally to an alignment system for use in a data storage system by confirming alignment and contact between two storage components through a conductive spring and pad continuity system.

BACKGROUND

Data storage libraries, and more particularly data storage libraries having mobile media, are typically used to store and retrieve large amounts of data for archiving purposes. Data storage libraries are generally comprised of drive systems adapted to read and write data to and from media often housed within the libraries. In some instances, the media is archived at locations within the library or, alternatively, moved out of the library for safe keeping. Due to a gain in momentum in disc drive technology, innovations including mobile disc drive magazines, assembled from multiple disc drives operating together as a cooperative media article, are poised for introduction in the marketplace as a mobile media for use in library systems.

Generally speaking, mobile disc drive magazines are adapted to plug into a power source and data lines using typical male and female plug and socket configurations. In some configurations, these mobile magazines slide into a docking fixture, such as a docking station, adapted to receive and support the mobile magazine in alignment for providing power and transferring data. The docking station can function as the aforementioned drive system adapted to cooperate with the mobile magazines. The plug and socket system provide final alignment through the inherent mechanical channeling motion created when a plug is inserted into a socket. Plugs and sockets are typically made out of conductive metals, such as copper or gold for example. For the most part, the plugs and sockets are sufficient for multiple insertions and removals, however in circumstances when the number of removal and insertion cycles become large, wear can occur in the plugs and sockets jeopardizing good electrical contact. Electrical contact is required not only for power transmittal but for data transmissions to the mobile magazine, from the docking fixture for example.

In an effort to provide a robust system for large numbers of electrical contact cycles between a mobile media apparatus and a complementary drive device while minimizing wear issues and yet still providing electrical contact alignment, an alternative device and method are proposed. It is to this subject matter that the claimed invention is generally directed.

SUMMARY OF THE INVENTION

The present invention relates generally to an alignment system for use in a data storage system by confirming alignment and contact between two storage components through a conductive spring and pad continuity system and overcomes the disadvantages and limitations of the prior art by providing a method and apparatus for enabling high numbers of contact cycles between two surfaces in a robust manner.

Embodiment of the present invention can therefore comprise an alignment system for use in a data storage system comprising: a first and second surface each having at least two contact zones; each of said contact zones comprising either a conductive spring or a conductive pad, wherein each of said conductive springs is adapted to engage a corresponding conductive pad, and wherein said engaging location on said pad is substantially flat, to form at least one closed circuit when said first and second surfaces are aligned and are in contact.

Embodiment of the present invention can further comprise a method to align a first and a second component of a data storage system comprising: aligning a first surface of the first component and a second surface of the second component, wherein each of said first and second surfaces comprises at least two contact zones and wherein said contact zones comprise either a conductive spring or a corresponding conductive pad; bringing said first and second surfaces in contact wherein said springs and said corresponding pads are engaged to create electrical continuity between said zones; confirming said continuity.

Embodiment of the present invention can further comprise a means to align components of a data storage system comprising: means for aligning a first and second surface comprising at least two contact zones wherein said contact zones comprise either a conductive spring or a corresponding conductive pad; means for generating electrical continuity between said corresponding springs and conductive pads when said first and second surfaces in contact; means for confirming said continuity.

Embodiment of the present invention can further comprise an alignment system for use in a data storage system comprising: a mobile storage device comprising a first surface having at least two contact zones; a mobile storage device docking station comprising a second surface having at least two contact zones; each of said contact zones comprising either a conductive pad or a conductive spring loaded pin capable of conforming flexibly in an axial direction; each of said conductive spring loaded pins is adapted to engage a corresponding conductive pad on a free end of said pin, wherein said engaging location on said pad is substantially flat, to form at least one closed circuit when said first and second surfaces are aligned and are in contact; a power source is adapted to power said closed circuit; and a continuity confirmation device is adapted to confirm said closed circuit.

Embodiment of the present invention can further comprise a system for aligning a first data storage system component with a second data storage system component, comprising: a first contact zone and a second contact zone disposed on a first surface of said first data storage system component; a third contact zone and a fourth contact zone disposed on a second surface of said second data storage system component, wherein each of said first, second, third, and fourth contact zones comprises a contact zone selected from the group consisting of: conductive springs and conductive pads, and wherein said first contact zone is complementary to said third contact zone, and said second contact zone is complementary to said fourth contact zone such that the first, second, third, and fourth contact zones cooperate to form a closed circuit when said first surface and said second surface are aligned and in contact with each other.

BRIEF DESCRIPTION OF THE DRAWINGS

FIG. 5C shows another embodiment of a conductive spring, in this case a conductive foam spring.

FIG. 6A illustrates a partial misalignment of a conductive spring and corresponding conductive pad.

FIG. 6B illustrates a fully aligned conductive spring contact surface and corresponding conductive pad contact surface.

DETAILED DESCRIPTION

Figure 1:
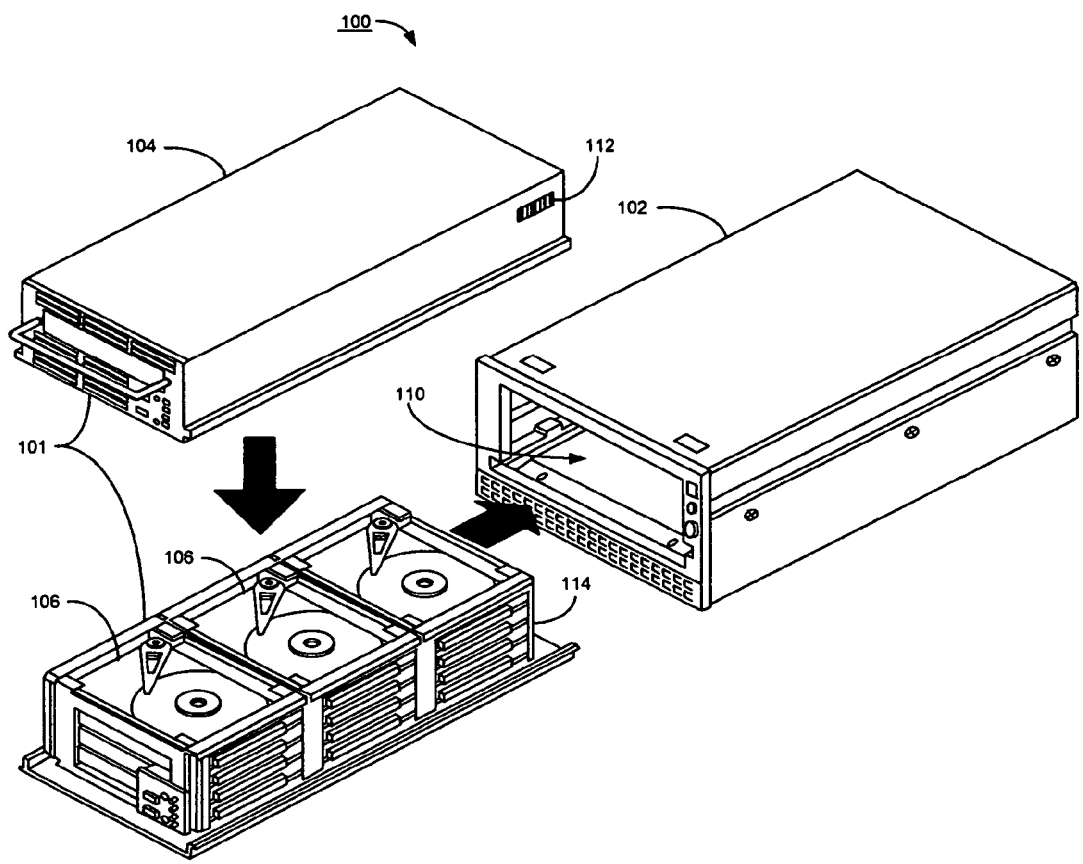
FIG. 1 is a pictorial representation of a disc drive magazine media pack and a disc drive magazine docking station consistent with a storage system embodiment of the present invention.

Referring to the drawings in general, and more specifically to FIG. 1, shown therein is an exploded perspective view of a mobile storage device 101 and a docking station 102 which comprise an embodiment of a data storage system 100 constructed in accordance with an embodiment of the present invention. In what follows, similar or identical structure is identified using identical callouts.

While the claimed invention has utility in any number of different applications, the mobile media device 101 and docking station 102 of FIG. 1 has been provided to illustrate a particularly suitable environment in which the claimed invention can be advantageously practiced. An embodiment of the mobile storage device as shown here is a disc drive magazine 101, such as an RXT magazine from Spectra Logic Corporation located in Boulder, Colo., and the docking station is a disc drive magazine docking station 102, and more particular an RXT magazine docking station. In this embodiment, a plurality of disc drives 106 are substantially contained by an enclosure 104 generally comprising the mobile disc drive magazine 101. The mobile disc drive magazine 101 is adapted to be received by an opening 110 in the disc drive magazine docking station 102. The engaging surface 114 of the disc drive magazine 101 is adapted with electrical contacts (not shown) to contact with complementary electrical connectors (not shown) on the engaging surface (not shown) of the docking station 102. The insertion of the mobile disc drive magazine component 101 into the disc drive magazine docking station component 102 forms an embodiment of the data storage system 100. The disc drive magazine docking station 102 is capable of being electrically connected with a host device, such as a computer for example, or other device/s by a coupling means, such as wires, plugs-in, or any combination or equivalents thereof, just to name a few examples. Additionally, communication to the docking station 102 can include the described electrical connections in addition to wireless, such as radio frequency for example. The enclosure 104 shows an example of an identification (ID) bar code 112 for identifying the mobile media device 101, such as when archived at a remote storage location for example. In one embodiment, the mobile disc drive magazine 101 could be configured to operate as a RAID (Redundant Array of Independent Disc [drives]) device.

Figure 2:
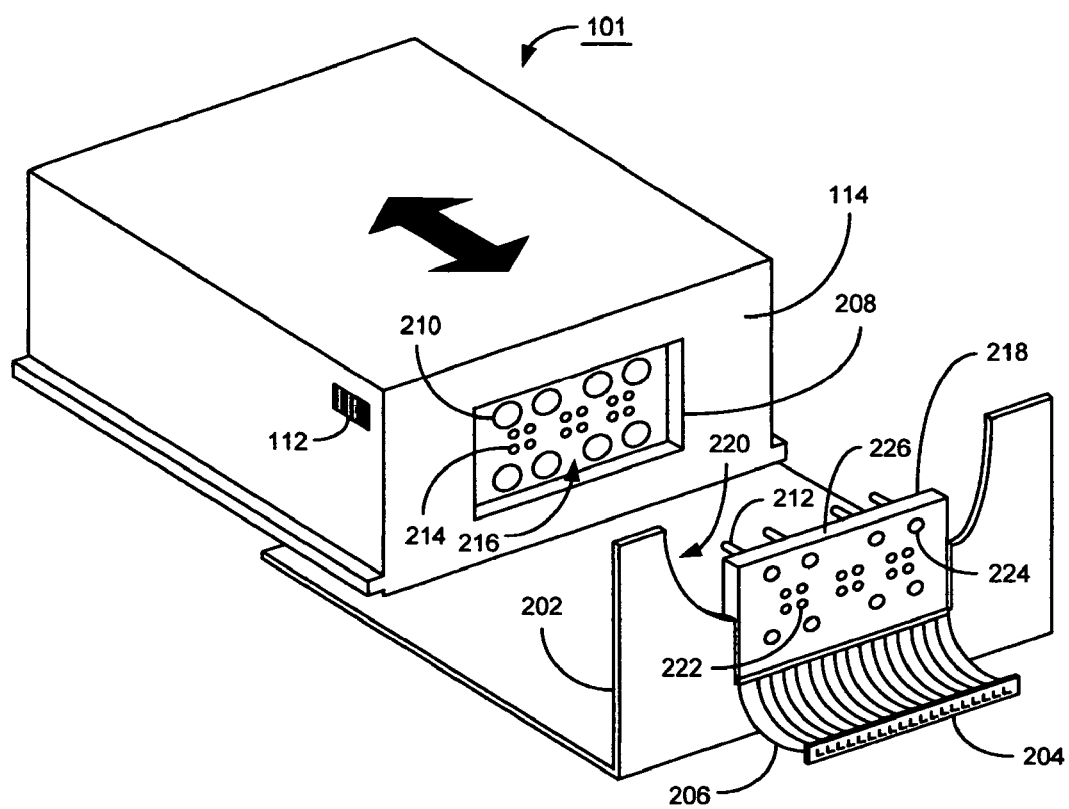
FIG. 2 is a perspective view of an embodiment of the present invention wherein a disc drive magazine is positioned to engage a docking station engaging surface.

Referring to FIG. 2, shown therein is a perspective view of an embodiment of the present invention wherein the disc drive magazine 101 is positioned to engage the docking station engaging surface 202. In the illustrative embodiment shown, the disc drive magazine 101 is adapted with an electrical contact surface 216 supporting eight contact zones comprising alignment contact pads 210 and twelve contact zones comprising data contact pads 214. The contact surface 216 is shown disposed in a recessed opening 208 in the disc drive magazine engaging surface 114. The docking station engaging surface 202 supports an electrical contact device 226 having a complementary contact surface 218 to the disc drive magazine contact surface 216. Cut-away portions 220 in the docking station engaging surface 202 help to illustrate the docking station contact device 226 construction. This docking station contact device 226 is adapted to complement the magazine contact surface 216 by supporting eight alignment contact zones 224 comprising conductive spring loaded alignment pins 212 and twelve data contact zones 222 comprising conductive spring loaded data pins (not shown) all capable of compressing axially. The flex circuit 206 is adapted to provide power and data signals to the contact zones 222 and 224 via the docking station contact device 226. As used herein, the term "spring" is meant to imply resilience, as may be achieved using coil springs, leaf springs, foam springs, or by exploiting the inherent elasticity of certain materials. The flex circuit is connected to a plug combination connector bar 204 enabling electrical connection with a host device or other device, such as a data library system for example.

The storage device comprising the disc drive magazine 101 and the docking station 102 is enabled to transmit data when electrical contact is made between the contact zones, such as the data contact zones 222 and the data contact pads 214 for example. By moving the aligned magazine contact surface 216 in contact with the docking station contact surface 218 wherein the spring loaded alignment pins 212 are in contact with the corresponding alignment contact pads 210, electrical continuity can be established and, in some embodiments, a closed circuit between the contact zones created. Establishing alignment through electrical continuity can provide feedback to an entity using the storage device, such as a host or library system for example, that the mobile media device 101 and the docking station 102 are adequately engaged to operate. The feedback also may take the form of an indicator, whether visual, aural, or both, confirming adequate engagement to a human operator of the device and system.

Figure 3A:
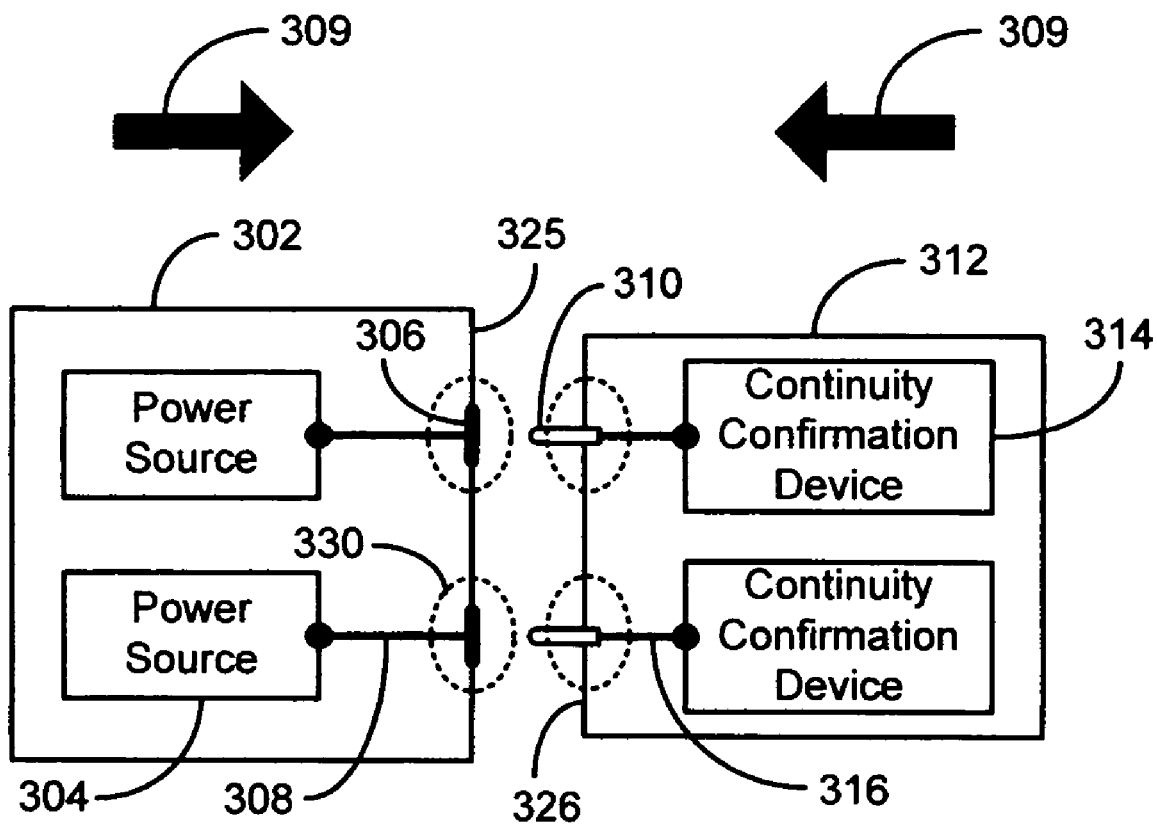
FIG. 3A is a block diagram consistent with some embodiments of the present invention illustrating continuity being established between a power source and a continuity confirmation device when two storage components are brought in contact.

FIG. 3A is a block diagram consistent with some embodiments of the present invention illustrating how continuity can be established between a power source 304 and a continuity confirmation device 314 when two storage components 302 and 312 are brought in contact 309. Here, a first storage component 302 having a first surface 325 is aligned for contact with a second storage component 312 having a second surface 326. The first storage component 302 has two power sources 304 connected 308 to two conductive pads 306 disposed substantially on the first surface 325 at two contact zones 330, wherein the contact zones 330 are designated by the dashed ellipses. While the power sources 304 are illustrated as part of a first storage component 302, as will be seen, such disposition is not critical, and the power sources could be part of the second component. The power source 304 could, in some embodiments, originate as a power supply external to the first storage component 302, such as a battery or a line to a wall socket just to name a couple examples. The second storage component 312 is shown having two continuity confirmation devices 314 connected 316 to two conductive springs 310 disposed at two contact zones 330 disposed substantially at the second surface 326. When the first surface 325 and the second surface 326 are aligned such that the opposing zones 330 are aligned and brought together, as shown by the arrows 309, contact is made between the first 325 and second 326 surfaces through the conductive springs 310 and corresponding conductive pads 306. The power sources 304 are capable of providing power, such as a voltage for example, that can be sensed by the continuity confirmation devices 314. As illustrated here, the pads are substantially flat facilitating contact between the spring 310 and the pad 306 in a non-male/female relationship. A male/female relationship is considered to be a configuration wherein a first connector member is received by second connector member by having a conforming inverse shape, such as a plug and socket for example.

Figure 3B:
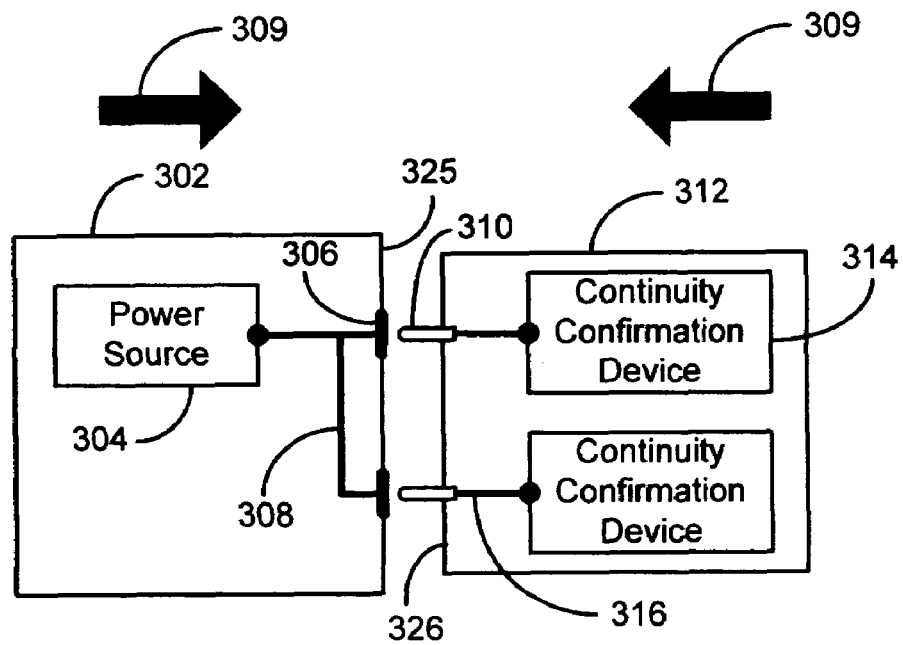
FIG. 3B is a block diagram of another embodiment of the present invention wherein continuity is established between a power source and two continuity confirmation devices when two surfaces are brought into contact.

FIG. 3B is a block diagram of another embodiment of the present invention wherein continuity is established between a power source 304 and two continuity confirmation devices 314 when two surfaces 325 and 326 are brought into contact. Here, the pads 306 are connected to the same power source 304 wherein continuity can be determined by the two continuity devices 314 upon contact of the first 325 and second 326 surfaces via the conductive pads 306 and corresponding conductive springs 310.

Figure 3C:
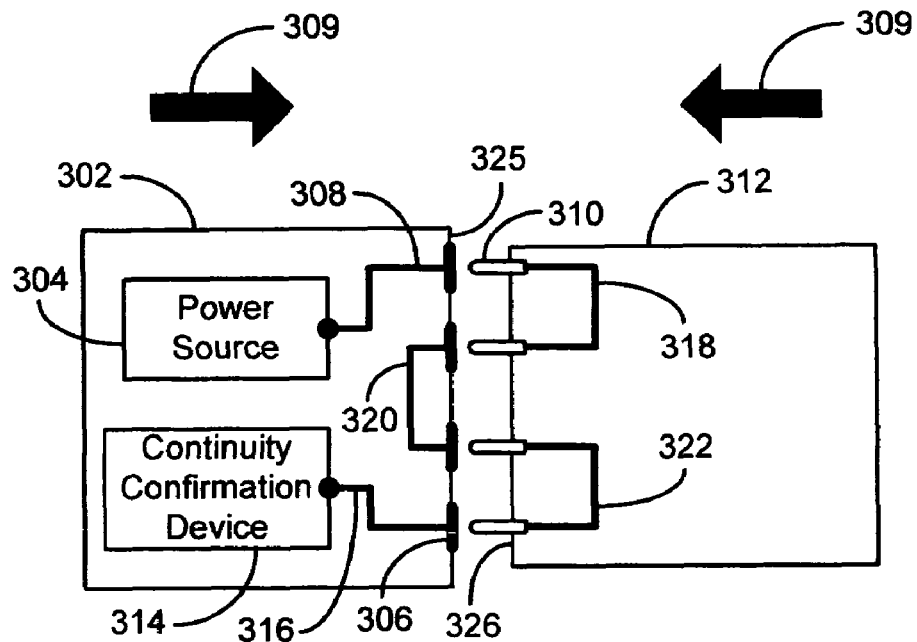
FIG. 3C is a block diagram of another embodiment of the present invention wherein continuity is established between a power source and a continuity confirmation device through a closed circuit created by two surfaces in contact.

FIG. 3C is a block diagram of another embodiment of the present invention wherein continuity is established between a power source 304 and a continuity confirmation device 314 through a closed circuit upon two surfaces being brought together 325 and 326. Here, both the power source 304 and the continuity confirmation device 314 are disposed in the first storage component 302. When the first 325 and second 326 surfaces are aligned and brought together in contact, as indicated by the arrows 309, wherein the conductive springs 310 are engaged with the corresponding conductive pads 306, power can be transmitted through a closed circuit pathway generated between the first 302 and second 312 storage components. This can be described as power passing from a first power lead 308 in the first storage component 302 to a first circuit 318 in the second storage component 312 back to a circuit 320 in the first storage component, back to a second circuit 322 in the second storage component 312 through a lead 316 to the continuity confirmation device 314 all via the conductive springs 310 and corresponding pads 306.

Figure 3D:
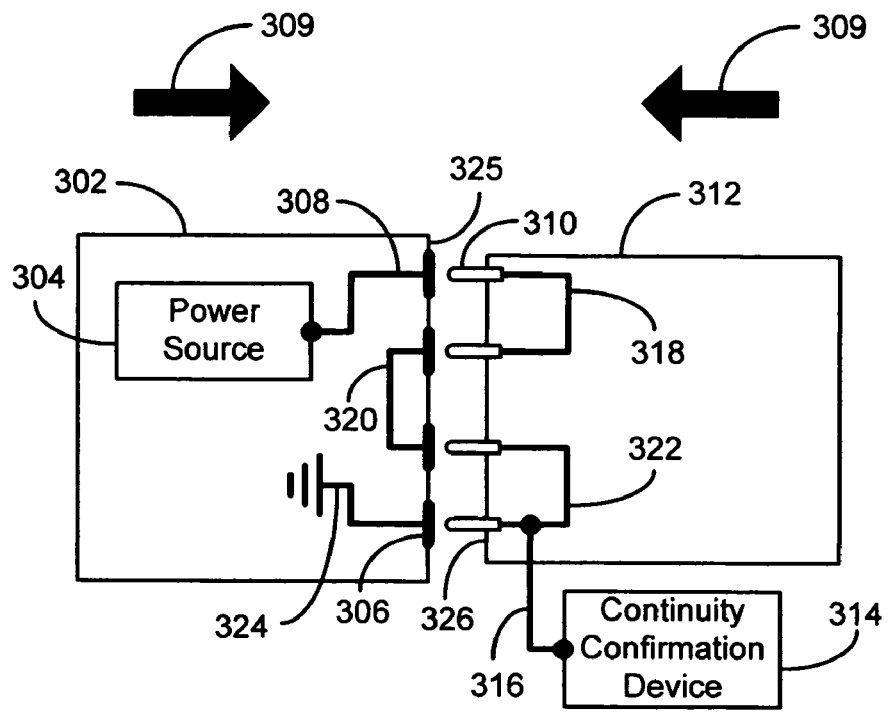
FIG. 3D is a block diagram of another embodiment of the present invention wherein continuity is established with a tap between a power source and ground through a closed circuit upon two surfaces being brought together.

FIG. 3D is a block diagram of another embodiment of the present invention wherein continuity is established with a tap between a power source 304 and ground 324 through a closed circuit upon two surfaces being brought together 325 and 326. Here, the power is transmitted between a first 302 and second 312 storage component much the same way as in FIG. 3C, however the circuit is terminated at a ground 324. A closed circuit is confirmed by the continuity confirmation device 314 used to tap into the circuit shown here at location 322. As can be shown here, the continuity device 314 need not be disposed in either the first 302 or second 312 storage components.

Figure 4A:
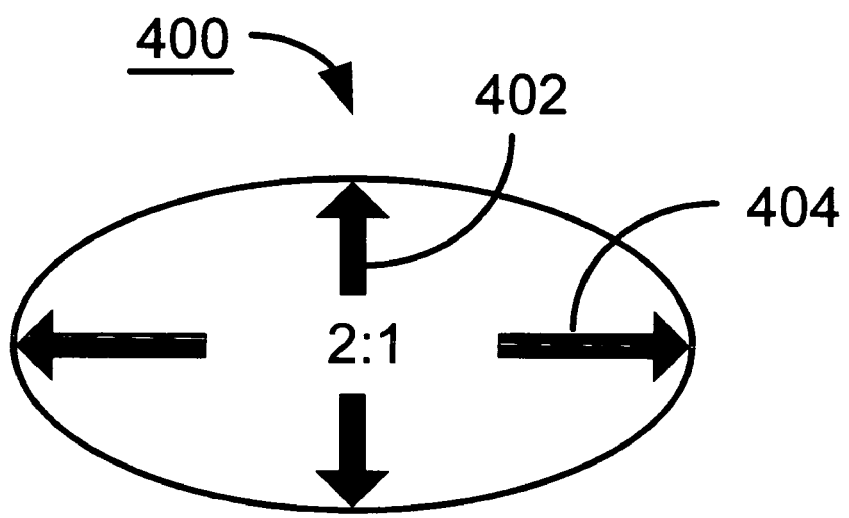
FIG. 4A is a statistically optimized ellipse shaped pad consistent with embodiments of the present invention adapted to accommodate a corresponding spring.
Figure 4B:
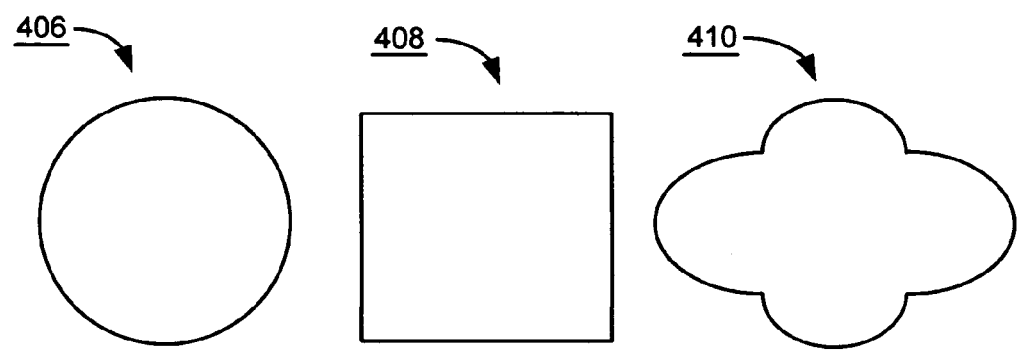
FIG. 4B shows some examples of other conductive pad shapes consistent with embodiments of the present invention.

FIGS. 4A and 4B illustrate a few alternative pad geometries consistent with some embodiments of the present invention. FIG. 4A is a statistically optimized ellipse shaped pad 400, determined by a statistical means, such as a two dimensional tolerance analysis, adapted to accommodate a corresponding spring 310. In a simplified example, the ellipse pad 400 could be optimized for contacting a corresponding spring 310 coupled with a storage component, such as 312, having a relative 2:1 tolerance such as two times the tolerance in the horizontal direction 404 versus the vertical direction 402. The ellipse pad 400 is a simplified example of a pad shape; however the shape could assume a more complex shape based on a different statistical analysis. FIG. 4B shows some examples of other conductive pad shapes consistent with embodiments of the present invention. Here, a circular shape 406, a rectangular shape 408 and a four lobed shape 410 are shown, however the shapes of the conductive pads are not limited to these examples, i.e. they could be triangles, polygons or unique shapes not described. In one preferred embodiment, the conductive pads, such as the generic pad 306, are substantially flat to facilitate in-plane movement of the free end of the conductive spring 310, with respect to the pads 306, when in contact. Conductive pads 306 can be connected to at least one conductive line, such as a wire or trace for example. The conductive pads 306 should provide a means for continuity, such as for power to flow through the pad 306 to a corresponding conductive spring 310, hence, the conductive pads 306 need not be limited to a single conductive material, such as copper or gold for example, let alone be comprised entirely of conductive material.

Figure 5A:
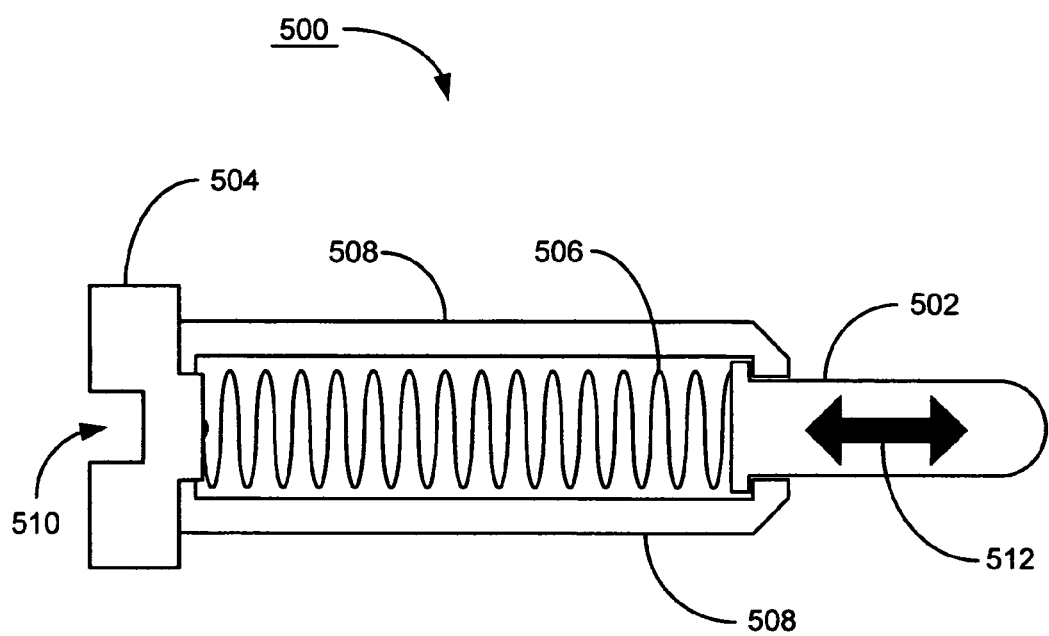
FIG. 5A is an embodiment of a conductive spring loaded pin consistent with conductive spring embodiments of the present invention.
Figure 5B:
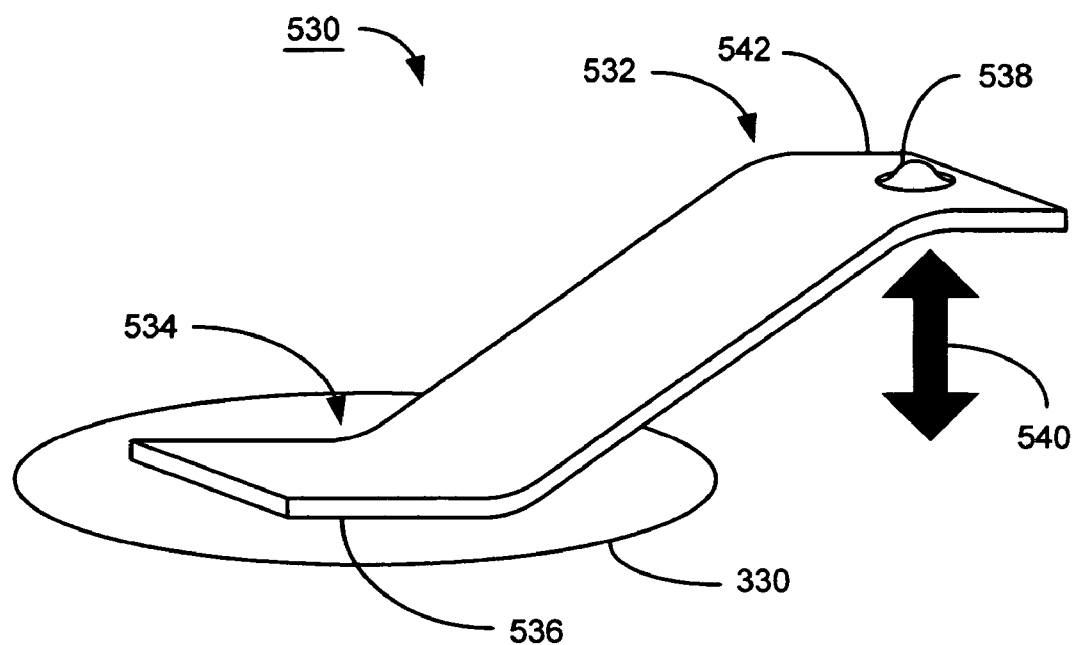
FIG. 5B shows an alternative embodiment of a conductive spring, in this case a conductive leaf spring.

FIG. 5A-5C show different embodiments of conductive springs 310 consistent with embodiments of the present invention. FIG. 5A is an embodiment of a conductive spring loaded pin 500. The pin 500 is comprised of a pin tip 502 capable of moving axially 512 within the pin housing 508. The pin tip 502 is the free end of the pin 500 adapted to engage a corresponding pad 306. The pin tip 502 is electrically connected to a pin base 504 by a conductive spring 506. The pin base 504 includes at least one location for an electrical connection to occur, in this case a connection can occur at a pin base connection socket 510. The conductive spring loaded pin 500 is adapted to engage a corresponding conductive pad 306 at the free end of the pin 500 such that the pin tip 502 can compress 512 to optimize contact between the pin 500 and the pad 306. The pin 500 is adapted to be disposed at a contact zone 330.

FIG. 5B shows an alternative embodiment of a conductive spring 310, in this case a conductive leaf spring 530. Here, the leaf spring 530 is attached to a contact zone 330, by some means of affixing the attached end 536 such as by soldering for example, to facilitate a conductive path from the contact zone 330 to the free end 542 of the leaf spring 530. Here, the leaf spring 330 has a contact zone bend 534, a free end bend 532 and a nipple 538 at the free end 542 adapted to contact a corresponding pad 306 when engaged. The leaf spring 530 could be made from a metal such as steel or could be a plastic member with a conductive path connecting the contact zone 330 with the nipple 538, for example. The leaf spring 530 is adapted to engage a corresponding conductive pad 306 at the free end of the spring 530 such that the spring 530 can deflect 540 to optimize contact between the nipple 538 and the pad 306.

FIG. 5C shows another embodiment of a conductive spring 310, in this case a conductive foam spring 550. In this embodiment of a conductive foam spring 550, a compressible foam core 564 is sandwiched between a two conductive plates forming a free end 552 and an attached end 562. The conductive plates 552 and 562 are electrically connected by a conductive member 556 capable of expanding and compressing with the foam at connection points 554 and 560 respectively. The spring 550 is attached to the contact zone 330 at the attached plate end 562 by an attaching means, such as solder, conductive glue, mechanical attachment, just to name three examples. The foam spring 550 is adapted to engage a corresponding conductive pad 306 at the free end 552 of the spring 550 such that the spring 550 can deflect 566 to optimize contact between the free end contact plate 552 and the pad 306.

FIG. 6A illustrates a partial misalignment of a conductive spring 310 and corresponding conductive pad 306. In this example, the true area of contact between the free end of the conductive spring's contact area 604 and the corresponding pad's contact area 602 is indicated by the shaded region 606. Here, continuity between an alignment contact spring and pad, such as 310 and 306 respectively, may exist and yet sufficient alignment for a data spring and pad, such as the pair used with pad 214, to effectively operate may not exist. For example, data springs and pads may require high frequency signals to pass through them which if they are not fully in contact, signal integrity may be compromised. FIG. 6B illustrates a fully aligned conductive spring contact surface 604 and corresponding conductive pad contact surface 602 as shown by the full contact shaded region 608. In this example, full alignment is achieved for optimal data transfer, for example. For at least this reason, in some preferred embodiments of the present invention, the quality of the contact between a conductive alignment spring 310 and corresponding conductive alignment pad 306 can be assessed.

Figure 7A:
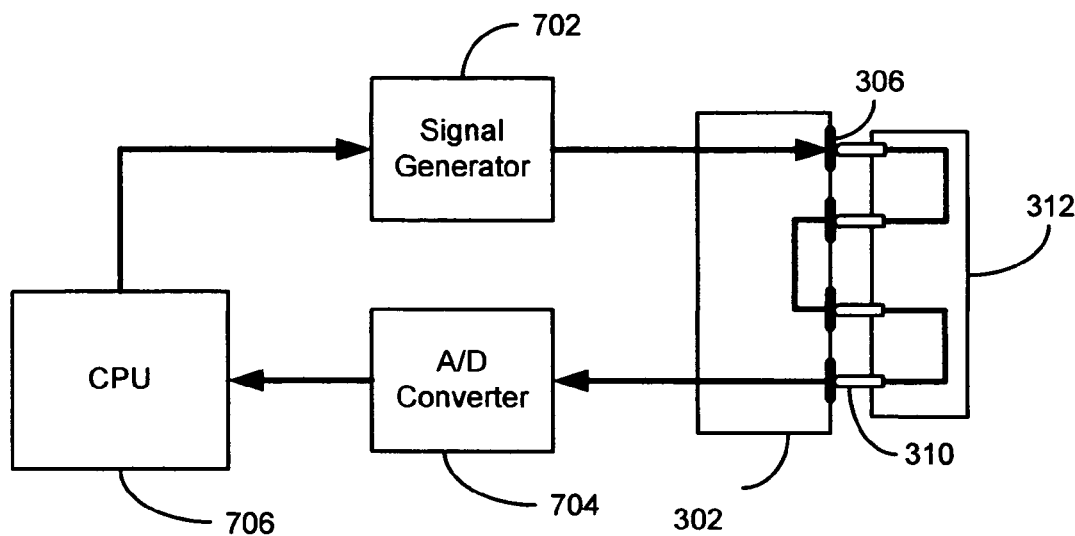
FIG. 7A is a block diagram of an alignment quality circuit consistent with embodiments of the present invention.

FIG. 7A is a block diagram of an alignment quality circuit consistent with embodiments of the present invention. Here, a signal generator 702 can transmit a known frequency across a closed circuit created from the contact between springs 310 and pads 306 disposed on a first 306 and second 312 storage device to an A to D (Analogue to Digital) converter 704. The resulting signal can then be analyzed by a CPU (Central Processing Unit) 706 or other analysis means such as a data signal processor for example. A graphical representation of the analysis at the CPU block 706 can be shown in FIG. 7B.

Figure 7B:
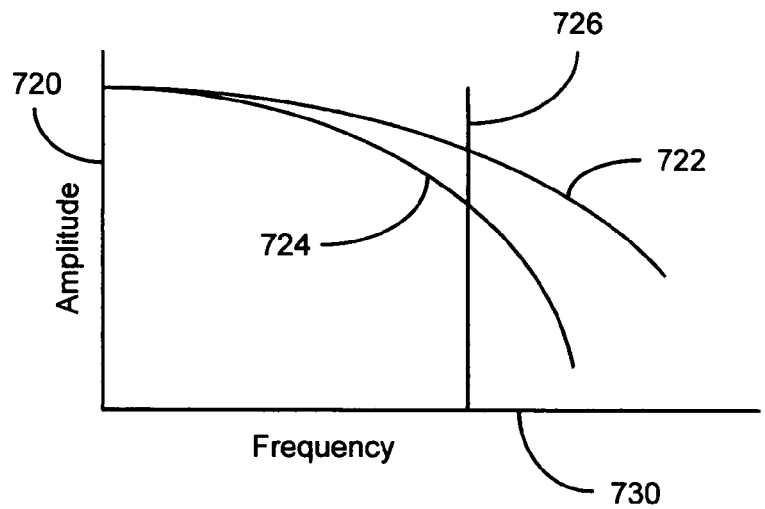
FIG. 7B is a graphical representation of voltage amplitude versus frequency for the circuit of FIG. 7A consistent with that embodiment of the present invention.

FIG. 7B is a graphical representation of voltage amplitude 720 versus frequency 730 for circuit 700 consistent with that embodiment of the present invention. Here, the amplitude of the voltage 720 naturally diminishes with an increased frequency 730. The curve 722 represents the predictable amplitude for a particular frequency at the frequency measurement line 726 for complete contact alignment as shown in FIG. 6B. The curve 724 represents the amplitude at the frequency measurement line 726 for the case where there is continuity but partial misalignment between the alignment contact spring 310 and corresponding pad 306 as illustrated in FIG. 6A. Hence, a lower than predicted amplitude at the frequency measurement line 726 is an indication that alignment may not be optimal between the spring 310 and pad 306.

Figure 8:
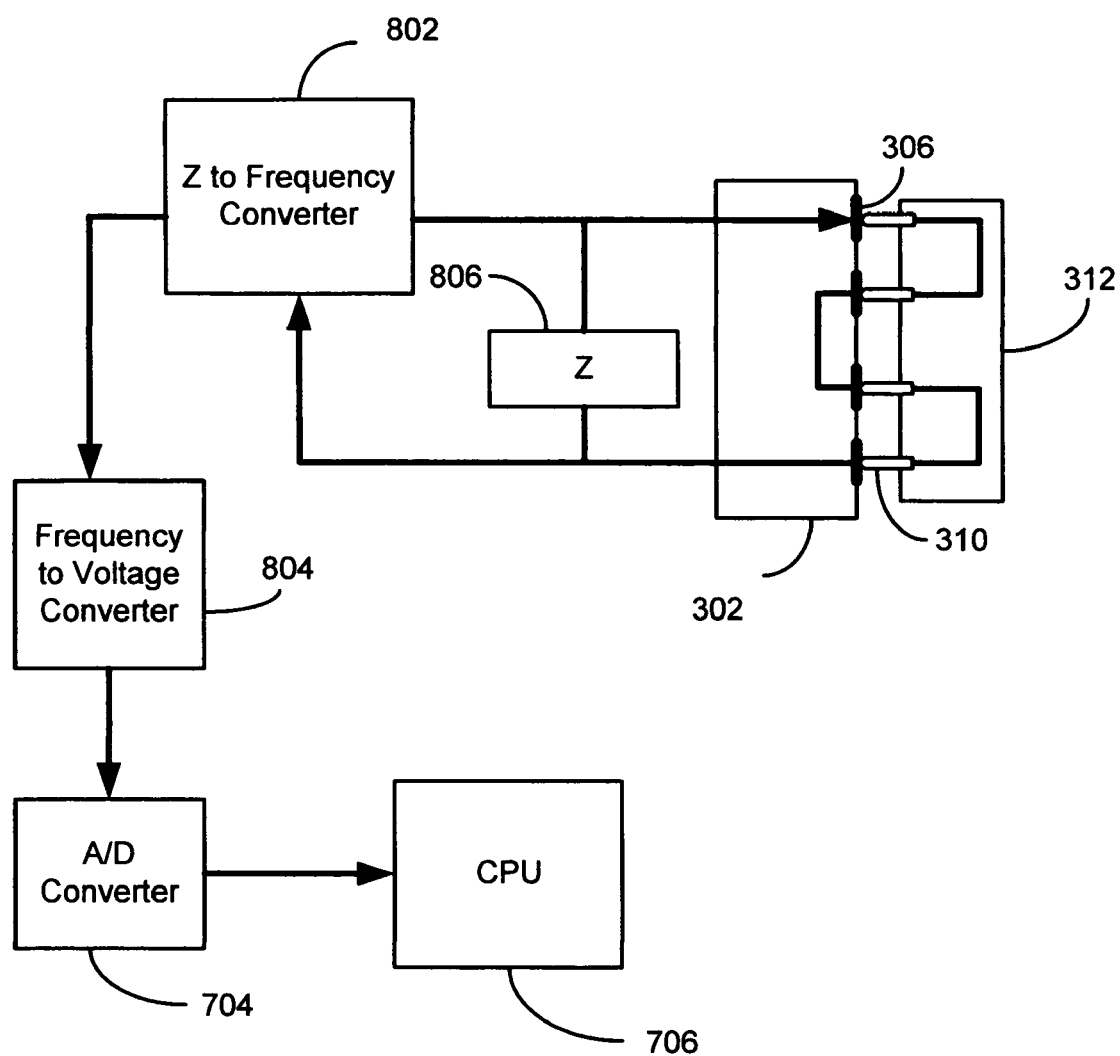
FIG. 8 is a block diagram of an alternative embodiment of an alignment quality circuit, in this case an impedance circuit, consistent with embodiments of the present invention.

FIG. 8 is a block diagram of an alternative embodiment of an alignment quality circuit consistent with embodiments of the present invention. Here, an impedance to frequency converter block 802 generates and senses a frequency as a function of impedance across the closed circuit created when the first 306 and second 310 storage devices are in contact through the springs 310 and pads 306. The impedance block 806 enables an impedance path that is independent of the closed circuit between the first 306 and second 310 storage devices. The incoming frequency from the impedance to frequency converter 802 is converted to voltage at the frequency to voltage converter block 804 followed by a conversion from analogue to digital by the A/D converter 704 for management by the CPU 706.

As should be appreciated, FIG. 7A-8 are examples of means to assess the quality of alignment and/or contact between a conductive alignment spring 310 and pad 306.

Figure 9:
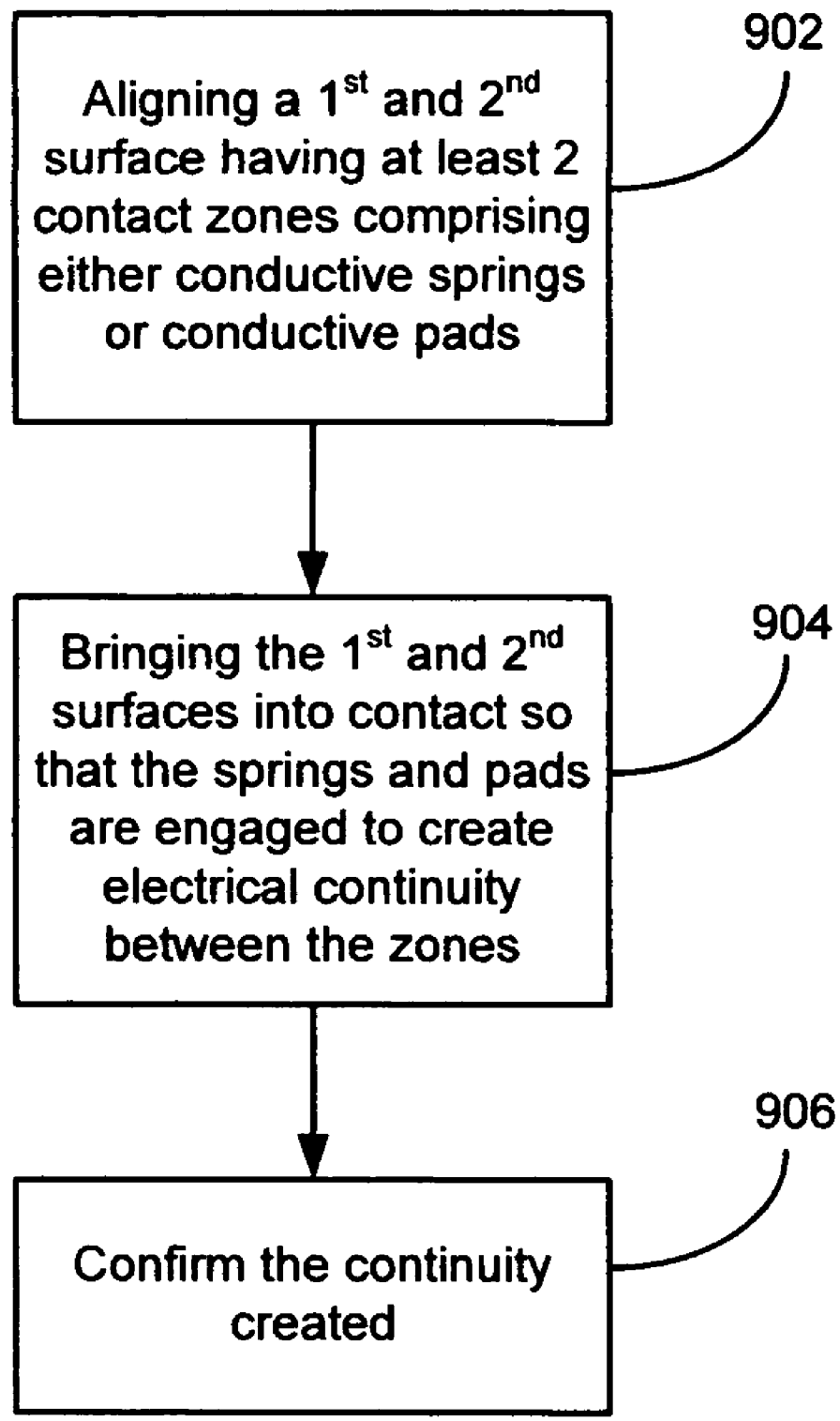
FIG. 9 illustrates a method to practice an embodiment of the present invention.

Referring now to FIG. 9, shown therein is a method to practice an embodiment of the present invention. It should be recognized that the steps presented in the described embodiments of the present invention do not require any particular sequence. In step 902, a first 325 and second 326 surface from a first 302 and second 312 storage component is aligned. Both the first 325 and second 326 surfaces have at least two contact zones 330 wherein each zone 330 either comprises a conductive spring 310 or a conductive pad 306. A means for aligning the first 325 and second 326 surfaces could be by a mechanical positioning system such as the disc drive magazine 101 sliding into an opening 110 in a docking station 102 or the recessed opening 208 adapted to receive the electrical contact device 226 in a closely conforming relationship. An alternative means for aligning could be by an actuator system biasing one surface relative to the other until sufficient desired alignment is accomplished. It should be recognized that the aligning means are not limited to the examples disclosed. In step 904, the first 325 and second 326 surfaces are brought together, such as shown by the arrows 309, so that the springs 310 and corresponding pads 306 form contact between the first 325 and second 326 surfaces to create electrical continuity between the zones 330. A means for generating electrical continuity is generally through conductive pathways such as copper wires soldered to a conductive metal pad, such as 306, or conductive metal spring, such as 310. In step 906, continuity between the pad 306 and corresponding spring 310 is confirmed. A means for confirming continuity could be accomplished by providing power to a circuit generated by the spring 310 and pad 306 engaging one another in contact, such as by a power source 304, and tapping into the circuit by a continuity confirmation device 314, such as an oscilloscope or multi-meter for example.

Figure 10:
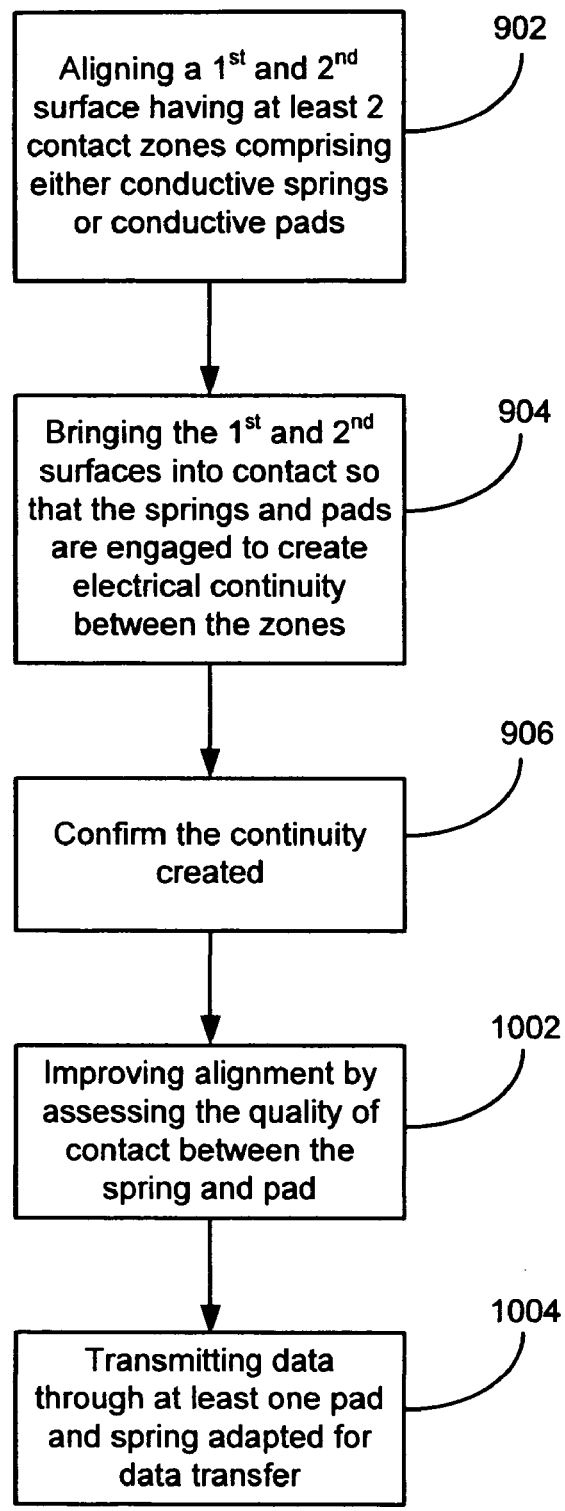
FIG. 10 shows an alternative method embodiment to practice the present invention which includes some method steps from FIG. 9.

FIG. 10 shows an alternative method embodiment to practice the present invention which includes method steps 902, 904 and 906 from FIG. 9. Step 1002 is a block in which the alignment can be improved by assessing the quality of contact between the spring 310 and pad 306. Here, continuity can be established and a determination can be made to the completeness of alignment, as shown by the contact contrasted in FIGS. 6A and 6B for example. In the event the springs 604 are not fully aligned with the pads 602, as shown in FIG. 6A a means for bringing them into sufficient alignment, such as FIG. 6B for example, could be employed, such as a fine positioning robotic system for example. Optimal quality of alignment, such as FIG. 6B, could be determined by a contact quality means, such as high frequency signals passing through contact zones, optical confirmation, laser, etc., and fed back to the positioning robotic system in a closed loop scenario, for example. In step 1004, data could be transmitted by means of a spring and corresponding pad arrangement, such as the data contact zones 222 and the data contact pads 214 for example, in conjunction with an alignment spring 310 and pad 306 configuration, i.e. co-alignment/data zones.

Figure 11:
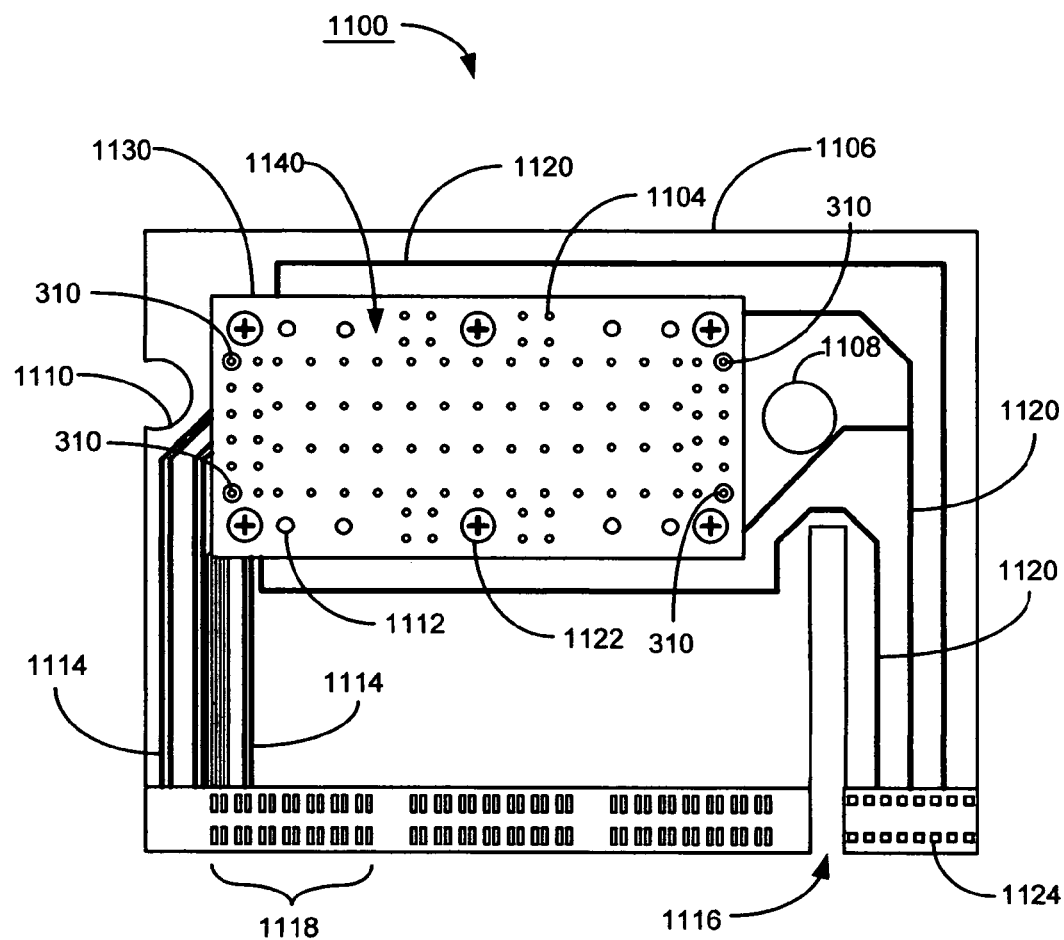
FIG. 11 shows a spring contact system suitable to commercially practice embodiments of the present invention.

FIG. 11 shows an environment suitable to commercially practice embodiments of the present invention. Here, a Spectra Logic contact device 1130 supports a plurality of IDI 101210 data spring loaded pins 1104, eight IDI 100891 power spring loaded pins 1112 and four IDI 101210 spring loaded co-alignment/data pins 310 from Interconnect Devices Inc. of Kansas City, Kans. laid out in contact zones as shown. The co-alignment/data pins 310 are disposed in the corners of the contact device 1130 to optimize alignment and planarity between the disc drive magazine contact surface, such as 114, and the docking station contact surface, such as 202. It should be clear to one skilled in the art that three contact zones, such as 210, can make a plane ensuring sufficient parallelism for component operability. Power is provided to the eight power pins 1112 from power plane line 1120 originating at the power connections 1124 that connect to the motherboard (not shown) disposed in an RXT disc drive magazine, similar to the disc drive magazine 101 of FIG. 1. The contact device 1130 is attached to a flexible printed circuit 1106 by screws 1122. Data line traces 1114 disposed on the flexible printed circuit 1106 provide a pathway for data signals and the continuity testing between the pins 310 and 1104 and data connections 1118 that connect to the motherboard (not shown) disposed in the RXT disc drive magazine. The spring contact system 1100 can be attached by screws (not shown) to the engaging surface 114 of the RXT disc drive magazine located at the semi circular mounting hole 1110, the circular mounting hole 1108 and the mounting slot 1116. The engaging surface 1140 is adapted to contact with a complementary engaging surface (not shown) disposed in an RXT docking station 1202, similar to the docking station 102 shown in FIG. 1.

Figure 12:
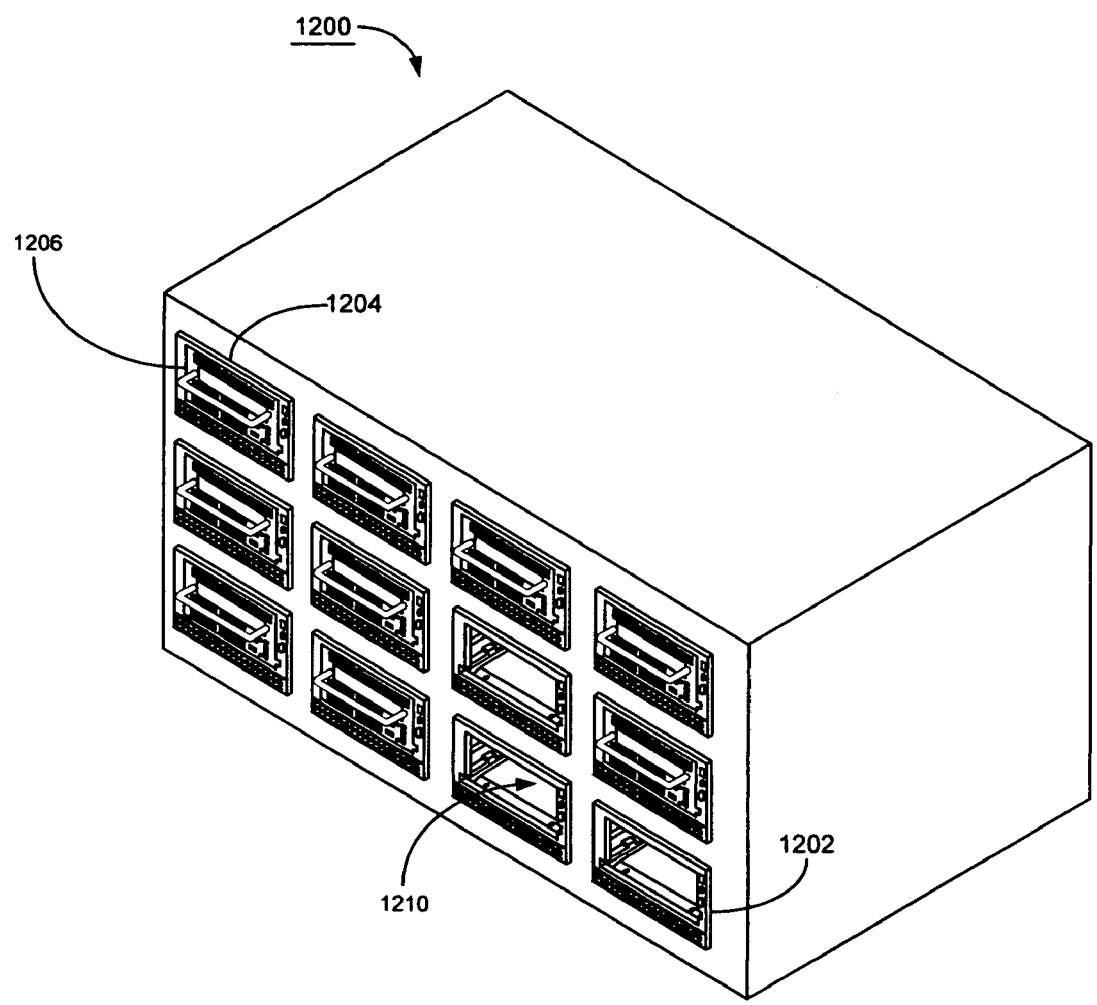
FIG. 12 shows an RXT library system suitable to commercially practice embodiments of the present invention.

FIG. 12 shows an RXT library system 1200 produced by Spectra Logic Corporation supporting twelve RXT docking stations 1202. The docking station 1202 receives an RXT disc drive magazine 1206 in a receiving opening 1210, similar to the opening 110, in the face of the docking station 1202 to form an RXT data storage system 1204, similar to the data storage system 100. The RXT docking station 1202 comprises the complementary engaging surface (not shown) with metal pads having a surface diameter four times the diameter of the spring loaded pins 1112, 310 and 1104. Contact is made between the spring loaded pins 1112, 310 and 1104 and complementary pads (not shown) upon insertion of the RXT magazine 1206 into the RXT magazine docking station 1202. The RXT library system 1200 is equipped with sensing devices and algorithms to confirm contact between the RXT magazine 1206 and docking station 1202 through the co-alignment/data pins 310 and complementary pads (not shown). When contact and alignment are confirmed, the RXT library system 1200 is enabled to store and retrieve data with the RXT magazine 1206 through the RXT docking station 1202.

Figure 13:
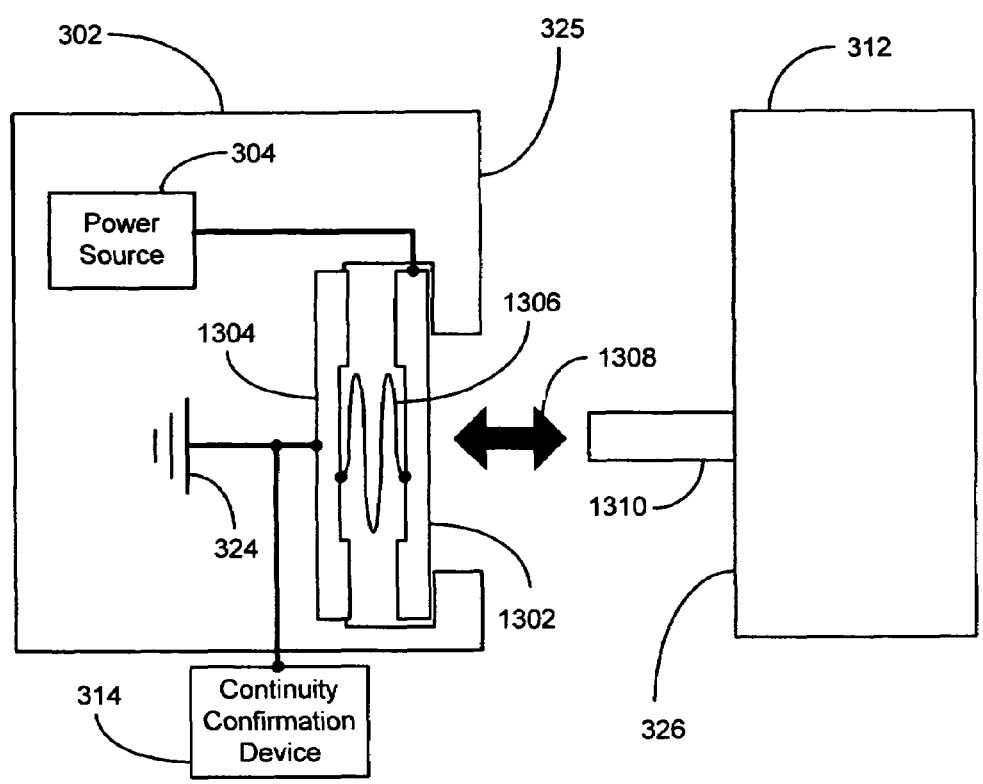
FIG. 13 shows an embodiment of the present invention in which continuity could be established entirely within one storage component.

FIG. 13 shows an embodiment of the present invention in which continuity could be established entirely within one storage component, such as 302. Here, a first pad 1304 is anchored to the first storage component 302. Contained within the first storage component 302 is a second pad 1302 having a spring element 1306 disposed between the first 1304 and second 1302 pad. The first 1304 and second 1302 pads have an open circuit relationship until the first surface 325 and second surface 326 of the storage components, 302 and 312 respectively, are brought together 1308 such that a compression member 1310, such as a pin, compresses the second pad 1302 to electrically contact the first pad 1304. When the first 1304 and second 1302 pad are in contact, continuity between the power source 304 and ground 324 is created and can be confirmed by a continuity confirmation device 314. Here, the spring and pad system is the combination of the compression member 1310, second conductive pad 1302, spring device 1306 and the first pad 1304. In an alternative embodiment, the spring 1306 could be replaced by a means separating the first 1304 and second 1302 pads in a non-contact and non-closed circuit state such as by a magnetic separation means for example.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular spring, such as 310, and pad, such as 306, elements and zone, such as 330, layouts may vary depending on the particular geometry supporting the alignment system, such as FIG. 3A-3D for example, and storage system/s, such as shown in FIG. 2, while maintaining substantially the same functionality without departing from the scope and spirit of the present invention. In addition, although the preferred embodiments described herein are directed to data storage systems using mobile media and related technology, it will be appreciated by those skilled in the art that the teachings of the present invention can be applied to other systems without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A data storage alignment system comprising:
a first and second surface associated with a data storage system, said first and second surface each having at least two contact zones;
each of said contact zones comprising either an electrically conductive spring or an electrically conductive pad,
an engaging location on each of said pads that is substantially flat, said engaging location adapted to make electrical contact with each of said conductive springs to form at least one closed electrical circuit confirming alignment when said first and second surfaces are aligned and are in contact via said engaging locations.

2. The alignment system of claim 1 further comprising a continuity confirmation device adapted to confirm alignment of said first and second surfaces from said closed circuit.

3. The alignment system of claim 1 further comprising a third and fourth contact zone on each of said first and second surfaces wherein three of said contact zones are arranged to define a plane.

4. The alignment system of claim 1 wherein said spring is a spring loaded pin configured to engage said pad axially.

5. The alignment system of claim 1 wherein a contact quality of said engagement is determined.

6. The alignment system of claim 1 wherein said contact zones are adapted function as both alignment zones and data zones.

7. The alignment system of claim 1 further comprising at least a third contact zone wherein said contact zones are disposed on said first and second surfaces in an arrangement that optimally confirms alignment and planarity of said first and second surfaces when said closed circuit is formed.

8. The alignment system of claim 1 wherein said contact zones do not engage in a plug and socket relationship when in said contact to confirm alignment of said first and said second surfaces via said closed circuit.

9. The alignment system of claim 1 wherein said first surface is a surface on a mobile storage device and said second surface is a surface on a docking station.

10. The alignment system of claim 9 wherein said first surface comprises only conductive springs and said second surface comprises only conductive pads.

11. The alignment system of claim 9 further comprising a continuity confirmation device disposed in said docking station capable of confirming said closed circuit.

12. The alignment system of claim 9 further comprising a source of power adapted to supply power to at least one of said zones attached to said second surface.

13. The alignment system of claim 1 further comprising at least one other contact zone on each of said surfaces adapted for transferring digital data via a data transfer spring and data transfer pad.

14. The alignment system of claim 13 wherein said at least one data transfer spring is a spring loaded pin configured to engage said corresponding pad axially and said spring and pad are disposed on said surfaces attached to a mobile media and docking station.

15. The alignment system of claim 14 wherein said mobile media is a disc drive magazine.

16. A method to align a first and a second component of a data storage system comprising:
aligning a first surface of the first component and a second surface of the second component associated with said data storage system, wherein each of said first and second surfaces comprises at least two contact zones and wherein said contact zones comprise either a conductive spring or a corresponding conductive pad;
bringing said first and second surfaces in contact wherein said springs and said corresponding pads are engaged to create electrical continuity between said zones wherein said zones do not engage in a male/female relationship;
confirming said alignment from said continuity.

17. The method of claim 16 wherein said confirming step is accomplished with a continuity confirmation device.

18. The method of claim 16 further comprising transmitting data through at least one additional said spring and said corresponding pad adapted for said data transfer, wherein said spring and pad are not part of a plug and socket connector configuration.

19. The method of claim 16 wherein the aligning step is improved with an alignment device by assessing a quality of said contact between said spring and said pad.

20. A means to align components of a data storage system comprising:
means for aligning a first and second surface associated with said data storage system comprising at least two contact zones wherein said contact zones comprise either a conductive spring or a corresponding conductive pad;
means for generating electrical continuity between said corresponding springs and conductive pads when said first and second surfaces in contact wherein said springs and pads are not part of a plug and socket connector configuration;
means for confirming said aligning via said continuity.

21. The means of claim 20 further comprising means for transferring data through at least one additional said spring and said corresponding pad adapted for said data transfer.

22. The means of claim 20 further comprising optimizing said pad shape on tolerances associated with said components of said data storage system for improving said means to align said components.

23. The means of claim 20 wherein said means for generating electrical continuity is by a quality assessment optimization means.

24. The means of claim 20 for generating electrical continuity is accomplished through a closed circuit.

25. The means of claim 24 wherein said means for confirming continuity is by providing power to said circuit and monitoring said power in said circuit with a continuity confirmation device.

26. A data storage alignment system comprising:
a mobile storage device comprising a first surface having at least two contact zones;
a mobile storage device docking station comprising a second surface having at least two contact zones;
each of said contact zones comprising either an electrically conductive spring or an electrically conductive pad;

each of said conductive springs is adapted to engage a corresponding conductive pad at a substantially flat engaging location associated with said pad, to form at least one closed electrical circuit when said first and second surfaces are aligned and are in contact via said engaging location.

27. The alignment system of claim 26 wherein said mobile storage device is a disc drive magazine.

28. A data storage alignment system comprising:
a mobile storage device comprising a first surface having at least two contact zones;
a mobile storage device docking station comprising a second surface having at least two contact zones;
each of said contact zones comprising either a conductive pad or a conductive spring loaded pin capable of conforming flexibly in an axial direction;
each of said conductive spring loaded pins is adapted to engage a corresponding conductive pad on a free end of said pin, wherein said engaging location on said pad is substantially flat, to form at least one closed circuit when said first and second surfaces are aligned and are in contact;
a power source is adapted to power said closed circuit; and
a continuity confirmation device is adapted to confirm said closed circuit.

29. A data storage related alignment system comprising:
a first and second surface associated with a data storage system each having at least two contact zones;
said contact zones forming a conductive spring and pad system adapted to generate a continuity path through said system, wherein said continuity path confirms alignment of said first and second surfaces wherein said contact zones are engaged in a non-male/female relationship when said first and said second surfaces are in contact.

30. A system for aligning a first data storage system component with a second data storage system component, comprising:
a first, a second and a third contact zone disposed on a first surface of said first data storage system component wherein said first, second and third contacts zones are arranged to define a plane;
a fourth, a fifth and a sixth contact zone disposed on a second surface of said second data storage system component,
wherein each of said contact zones comprises a contact zone selected from the group consisting of: conductive springs and conductive pads, and
wherein said first contact zone is complementary to said fourth contact zone, said second contact zone is complementary to said fifth contact zone and said third contact zone is complementary to said sixth contact zone such that the first, second, third, fourth, fifth and sixth contact zones cooperate to form a closed circuit, wherein said closed circuit is used to confirm alignment of said first and second components.

* * * * *